United States Patent
Agarwal et al.

(10) Patent No.: US 10,275,808 B1
(45) Date of Patent: Apr. 30, 2019

(54) ITEM REVIEW SYSTEM THAT PROVIDES COMPARATIVE INFORMATION TO REVIEWER

(71) Applicant: Amazon Technologies, Inc., Seattle, WA (US)

(72) Inventors: Pranav Agarwal, Hyderabad (IN); Aman Gupta, Pittsburgh, PA (US)

(73) Assignee: Amazon Technologies, Inc., Seattle, WA (US)

( * ) Notice: Subject to any disclaimer, the term of this patent is extended or adjusted under 35 U.S.C. 154(b) by 1069 days.

(21) Appl. No.: 14/548,143

(22) Filed: Nov. 19, 2014

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0282* (2013.01); *G06Q 30/0281* (2013.01); *G06Q 30/0641* (2013.01)

(58) Field of Classification Search
CPC .......... G06Q 30/0282; G06Q 30/0281; G06Q 30/0641
USPC ................................. 705/26.1–27.2
See application file for complete search history.

(56) References Cited

U.S. PATENT DOCUMENTS

| | | | |
|---|---|---|---|
| 7,483,846 B1 | 1/2009 | Kumar et al. | |
| 7,664,669 B1 | 2/2010 | Adams et al. | |
| 8,090,621 B1 | 1/2012 | Chakrabarti et al. | |
| 8,145,512 B1 | 3/2012 | Henne et al. | |
| 2002/0010625 A1* | 1/2002 | Smith | G06Q 30/02 705/14.52 |
| 2008/0071602 A1* | 3/2008 | Ojakaar | G06Q 30/02 705/14.44 |
| 2011/0087737 A1* | 4/2011 | Smith | G06Q 30/02 709/205 |

OTHER PUBLICATIONS

Quint, B. (Feb. 1999). E-commerce and traditional online. Information Today, 16, 10-11+. Retrieved from https://dialog.proquest.com/professional/docview/214853999?accountid=142257 (Year: 1999).*

* cited by examiner

*Primary Examiner* — William J Allen
*Assistant Examiner* — Anand R Loharikar
(74) *Attorney, Agent, or Firm* — Knobbe, Martens, Olson & Bear, LLP

(57) ABSTRACT

An item review system is disclosed that detects that an item reviewed or being reviewed by a user is similar to one or more items previously reviewed by the user. In some embodiments, the system provides an option for the user to modify the prior review of each such similar item, as may be desirable to capture the user's changed perception of the previously reviewed item. The system may additionally or alternatively display the prior review(s) as the user generates the new review, such that the user can take these prior reviews into consideration.

13 Claims, 5 Drawing Sheets

ITEM REVIEW SYSTEM THAT PROVIDES COMPARATIVE INFORMATION TO REVIEWER

BACKGROUND

Networked systems have become an increasingly prevalent and vital technology. Networks, such as the Internet, allow large numbers of computer systems and people to swiftly transfer data across the globe. These networks are often used to provide network applications, such as web applications and mobile applications, to end users. These web and mobile applications are often hosted by server computers that serve content to end user devices.

For example, ecommerce systems commonly provide various types of informational services for assisting users in evaluating products and other offerings. Such services can greatly aid consumers in deciding which product or offering to purchase. These informational services are particularly valuable for purchases over a network, where customers do not have the opportunity to physically inspect or try out products.

One type of information service enables users to post reviews of specific items (e.g., products and/or services) represented in an electronic catalog. The reviews may be in the form of ratings on a defined scale (e.g., 1 to 5 stars), free-form text, or a combination of both. Users can read other users' reviews to determine whether to purchase a product or service. Thus, reviews can greatly aid users' buying decisions when shopping from an electronic catalog.

BRIEF DESCRIPTION OF THE DRAWINGS

Specific embodiments and inventive features will now be described with reference to the drawings, which are provided for purposes of illustration, and not limitation.

DETAILED DESCRIPTION

Figure 1A:
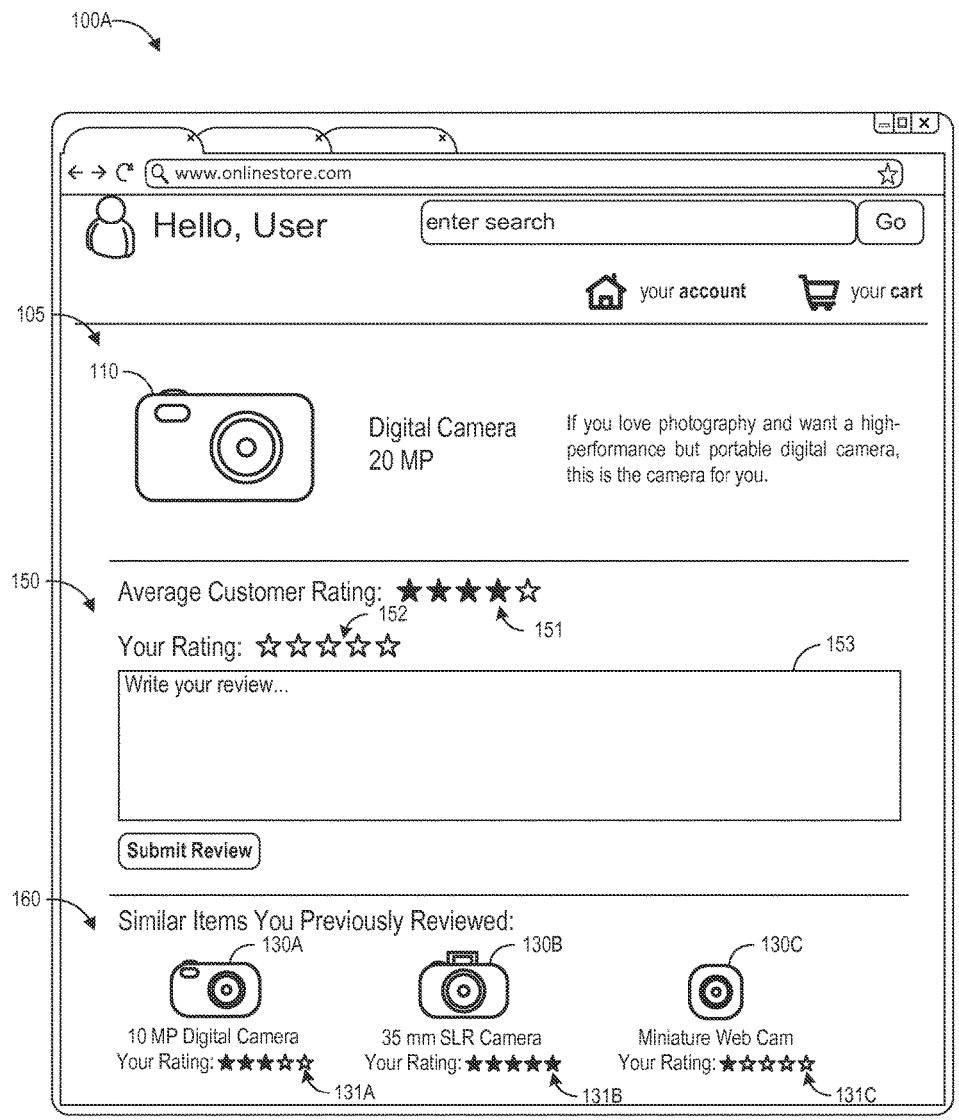
FIGS. 1A-1B illustrate embodiments of a user interface that presents a user with previous item reviews.

User perception of an item can change over time, for example as the user is exposed to newer versions of the item. User perception of an item can also change after the user is exposed to a similar item and gains a comparative perspective on the item. However, users typically do not modify previous reviews of the item as their perception of the item changes. As a result, users who may be evaluating the item for purchase are not presented with the current perceptions of other users in item ratings and textual reviews.

The above problems, among others, are addressed in some embodiments by the systems and associated processes described herein for developing and presenting more useful user reviews. These systems and processes can collect data representing an item review history of a user and determine whether any previously reviewed items are similar to a source item the user is now reviewing or has just reviewed. This data may be used to provide the user with the option to view and (in at least some cases) modify one or more of the user's previous reviews of similar items. In some embodiments, an appropriate timing or other constraint may be applied to determine whether to present the option to modify a prior review of a similar item. For example, the review modification option may be presented only if the previously-reviewed item is still available for purchase, or only if the user's prior review is less than X days old, where X may depend on the item type.

Presentation of previous reviews of similar items during the item review process can provide the user with comparative perspective on the source item based on the user's own previous reviews of similar items, thus eliciting more accurate item reviews from the user. Further, item similarity data may be used to solicit user modification of previous reviews of similar items to the source item. For example, after detecting that a user has completed providing feedback regarding a source item, the systems and associated processes described herein can present the user with the users' previous reviews of similar items together with functionality to modify or supplement any such previous reviews, if desired. Thus, the user is provided with the opportunity to modify or supplement previous feedback of items about which the user's perception may have changed due to exposure to the source item or other similar items. Accordingly, item similarity data can potentially be used to both present and elicit more thorough, current and useful feedback than existing review systems in some embodiments.

These item relationships are determined by analyzing user item viewing histories and/or other types of recorded behavioral data reflecting users' interests in particular items. See, e.g., commonly-owned U.S. Pat. No. 7,685,074, the disclosure of which is hereby incorporated by reference. This process may be repeated periodically (e.g., once per day or once per week) to incorporate the latest browsing activities of users. In some embodiments, item similarities can be determined based partly or wholly on automated analysis of item attributes. The resulting item-to-item association mappings may be used to provide review modification recommendations to users in various contexts.

To illustrate the review presentation and modification techniques, consider the following examples. As a first example, a user can regularly visit a content site for providing video information and reviews and provide feedback regarding movies he has watched. The user may be an enthusiastic movie critic, often rating movies just after watching them. A review service of the content site can determine that the user recently watched and reviewed "Rocky Balboa," providing a 10 out of 10 points rating for the movie. The next day the user's friend recommended that the user watch "Fight Club." After watching this movie, the user provided a 10 out of 10 points rating for this movie as well. Later, it occurred to the user that he does not consider "Rocky Balboa" to be on par with "Fight Club;" however, the user does not go back to the content site to change the rating for "Rocky Balboa."

In this scenario, the review modification processes described herein can solicit the user's modified feedback of "Rocky Balboa" when, or shortly after, the user reviews "Fight Club." For example, the review modification process can determine that the user has provided feedback for "Fight Club" and, based on similarity data indicating that "Rocky Balboa" is similar to "Fight Club" and also user review data indicating that the user previously reviewed "Rocky Balboa," present the user with functionality to modify the review for "Rocky Balboa." This functionality can be exposed to the user in a new display area overlaying a review creation interface (e.g., a pop up window) that was used by the user to review "Fight Club" in some examples. The review modification process can display an image of the movie "Rocky Balboa," the user's previous rating of the movie, and a prompt indicating why the user is being presented with this information together with the functionality to modify the review. The functionality can enable the user to change one or both of a previous rating (e.g., thumbs up or thumbs down, 1 to 10 points, one to five stars, and the like) and a previous textual review.

Alternatively, the functionality can be exposed to the user in an electronic message (e.g., e-mail, message within the content site, text message, etc.) at a predetermined time. For example, the review modification process may store reviews recommended for modification in association with a profile of the user, and at predetermined intervals (e.g., once per week, once per month) can send an electronic message to the user soliciting the modified feedback. The electronic message can include the source item (in this example, "Fight Club"), similar item (in this example, "Rocky Balboa"), the user's previous review, and functionality for modifying the review for each review recommended for modification.

With this system in place, the user has a more streamlined experience for modifying the earlier movie rating. In one example, after watching "Fight Club," the user eagerly points his mouse to the '10 out of 10' option. In response, a pop-up emerges, informing the user about one or more similar movies he recently reviewed. The user can use the pop-up and review modification functionality to downgrade "Rocky Balboa" to an 8 out of 10 while the comparison with "Fight Club" is fresh in the user's mind. If the user had submitted a textual (free form) review of "Rocky Balboa," the user may also be given the option to modify or supplement the textual review, such as by adding an addendum.

After receiving any modified reviews from the user, the review modification process can store the modified review in association with the corresponding item and the content site system can update aggregated user ratings associated with the item.

In another embodiment, the review presentation processes described herein can be used to present the user's previous review of "Rocky Balboa." Accordingly, the user can be presented with a comparison between the movies for providing feedback on "Fight Club," potentially soliciting more accurate comparative feedback for the movie "Fight Club." This can optionally be presented to the user together with functionality to modify the review of "Rocky Balboa" as the user is creating the review for "Fight Club."

Turning to another example, another user, who is a technological gadget enthusiast, bought a used tablet computer and instantly liked the device. He reviewed the product in an electronic catalog to be a 5 of 5 star rated product. Recently, he was gifted a new tablet computer and was blown away by the quality. The user stopped using the used tablet computer he had bought before because he liked the new tablet computer so much more; however, he forgot to change his 5 of 5 star rating for the used tablet.

As described above with respect to the first example, the review modification processes and review presentation processes can be implemented in this example in order to solicit modification of the user's previous review for the used tablet and/or present the previous review to the user during review of the new tablet for comparison. In one implementation, while rating the new tablet computer, the user notices the recommended previous review he provided regarding the used tablet computer, and the user downgrades the used tablet computer rating to 4 stars out of 5 and changes or supplements his textual review.

Such review modification processes and review presentation processes can serve two purposes. First, the review presentation processes can be used to obtain comparative feedback when a user is shown ratings for items similar to a source item he is currently rating. This can help guide the user regarding how he would like to review the source item in comparison to the similar items. Second, the review modification processes can be used to improve and update review data. For example, while or after reviewing a new item, a customer might want to change the review of an item he reviewed earlier. This event might be triggered because the new product might have changed the user's perception about the older product. Such a facility of identifying these older items and providing the user the opportunity to modify the older reviews can be beneficial for improving and maintaining accuracy of item ratings.

Aggregated information about review modifications can be generated and exposed to other users. In some examples, if a reviewer changes a review of an item in response to the review modification processes, other users viewing the review can be informed of the change when viewing the user's individual review. The context in which the reviewer made the change can also be exposed to other users (e.g., "Rating of item A changed upon assigning a higher rating to item B"). In the example discussed above, the item detail page for "Rocky Balboa" could be supplemented with an auto-generated message that "7 reviewers lowered their ratings of this item after rating Fight Club," or "10% of those who reviewed Fight Club after reviewing this movie opted to lower their rating of this movie." If the user had submitted a textual (free form) review of an item, the user may also be given the option to modify or supplement the textual review, such as by adding an addendum. The addendum or other modifications may be published together with an indication that the reviewer made the modification after assigning a particular rating to a similar item, as well as additional information related to the addendum or other modifications, such as the date and time of such modifications. For example, the addendum could be published with an auto-generated message that the reviewer added the addendum after assigning a rating of X to movie Y at a particular date and time.

In addition, different categories or types of items may be treated differently by the review modification processes and review presentation processes in some embodiments. To illustrate, the review modification processes and review presentation processes may implement a temporal threshold for presenting previous item reviews to users. In a category of items that may change rapidly, such as fashion, personal computing devices (e.g., smartphones, laptop computers, tablet computers, etc.) and digital entertainment systems (e.g., televisions, media players, gaming consoles, etc.), a smaller temporal threshold can be applied to only surface more recent previous reviews of related items. For other categories of items that may have a more enduring appeal (e.g., movies, books), a larger temporal threshold or no temporal threshold can be applied to surface older or all previous reviews of related items.

Although the examples above discuss downgrading item ratings, it is possible for the systems and processes described herein to enable a user to upgrade item ratings in some examples, and for a user to modify or supplement a text-based review without modifying a rating in some examples. Further, though specific types of items and reviews are provided in the examples herein, this is for illustrative purposes only and is not intended to limit the types of items and/or reviews that can be presented to users via the disclosed systems and processes.

As used herein, the term "item," in addition to having its ordinary meaning, is used interchangeably to refer to an item itself (e.g., a particular product) and to its description or representation in a computer system or electronic catalog. As will be apparent from the context in which it is used, the term may also sometimes be used herein to refer only to the item itself or only to its representation in a computer system.

Example User Interfaces

FIG. 1A illustrates an embodiment of a user interface 100A that presents a user with the user's previous reviews of similar items. The illustrated interface 100A includes a first display area 105 providing information about a source item, depicted as camera 110. The interface 100A also includes a second display area 150 for presenting a review creation interface enabling the user to provide a review of the camera 110 and a third display area 160 for presenting previous reviews of determined similar items. In this example, the user has reviewed three items 130A, 130B and 130C that have been identified by the system as being similar to the source item 110. If the user has not submitted a review of any similar items, the "similar items you previously reviewed" section may be omitted from the user interface 100A.

The second display area 150 for presenting the review creation interface includes average customer rating 151 of the camera 110, functionality 152 for the user to provide a rating, and functionality 153 for the user to enter a text-based review. The third display area 160 includes a presentation of previously-reviewed similar items 130A, 130B, 130C together with previous feedback from the user for each item, here displayed as ratings 131A, 131B, 131C. In other examples, part or all of a text-based review submitted by the user for items 130A, 130B, 130C can be presented to the user together with or instead of ratings 131A, 131B, 131C. Though displayed without functionality for the user to modify or supplement the ratings 131A, 131B, 131C or text-based reviews of similar items 130A, 130B, 130C, this may be provided in other examples. In one embodiment, if the user clicks on one of the similar items 130A, 130B or 130C in FIG. 1A, the user is presented with an interface for modifying or supplementing the prior review (including any textual review) of that item.

By surfacing for the user the user's own previous ratings 131A, 131B, 131C of similar items 130A, 130B, 130C together with the review creation interface, the interface 100A helps provide the user with context for reviewing the camera 110 through comparison with the user's own previous ratings 131A, 131B, 131C of similar items 130A, 130B, 130C. Accordingly, the user can provide a more meaningful review for the camera 110. The user may also be able to modify or supplement one or more of the prior reviews in order to make them consistent with the newly entered review.

Figure 1B:
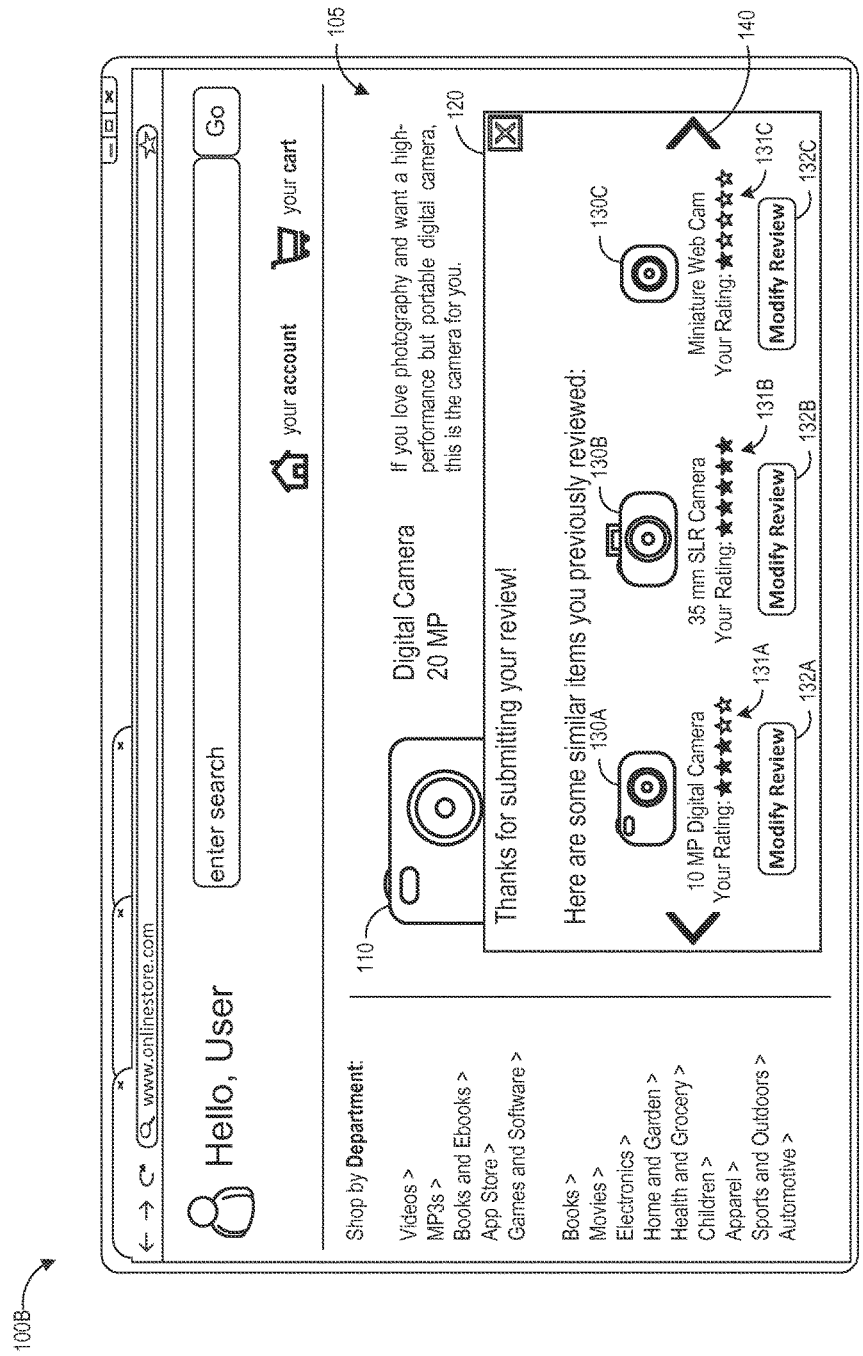

FIG. 1B illustrates another embodiment of a user interface 100B that presents a user with previous item reviews. The illustrated interface 100B includes a first display area 105 providing information about a source item, depicted as camera 110. The interface 100B also includes a second display area 120, illustrated in this example as a pop-up window or popover, for presenting the user with previously-reviewed items 130A, 130B, 130C determined to be similar to the camera 110. In this example, the second display area 120 is indicated as being presented after the user has submitted a review of camera 110.

The previously-reviewed items 130A, 130B, 130C are presented together with previous feedback from the user for each item, here displayed as ratings 131A, 131B, 131C. In other examples, part or all of a text-based review submitted by the user for items 130A, 130B, 130C can be presented to the user together with or instead of ratings 131A, 131B, 131C. In the illustrated example, functionality 132A, 132B, 132C for the user to modify or supplement the previous feedback is displayed as a user-selectable option and graphical button. Selection of the functionality 132A, 132B, 132C by the user can enable modification of the corresponding rating 131A, 131B, 131C and optionally of a text-based review of the corresponding item 130A, 130B, 130C. The user may be able to modify or supplement the review in the second display area 120 in some examples, or in a separately-presented display area or user interface generated based on the user selecting the functionality 132A, 132B, 132C to modify the feedback. In other examples, the functionality to modify the review may be built into the display of ratings 131A, 131B, 131C, for example by allowing the user to change the rating by selecting one of the stars, and the graphical buttons may be omitted.

In the illustrated example, the user is provided with navigation options 140 for viewing other similar items for which the user provided a review that did not fit in the display area 120 with the items 130A, 130B, 130C. In some embodiments, after the user provides a modified review for one of items 130A, 130B, 130C, another item can take its place in the display area 120. In some embodiments, after the user provides modified reviews for all of items 130A, 130B, 130C, another subgroup of the group of similar items can be presented in the display area 120. This can continue until the user has modified previously submitted reviews for all similar items or until the user selects an option to exit the display area 120.

Example System

Figure 2:
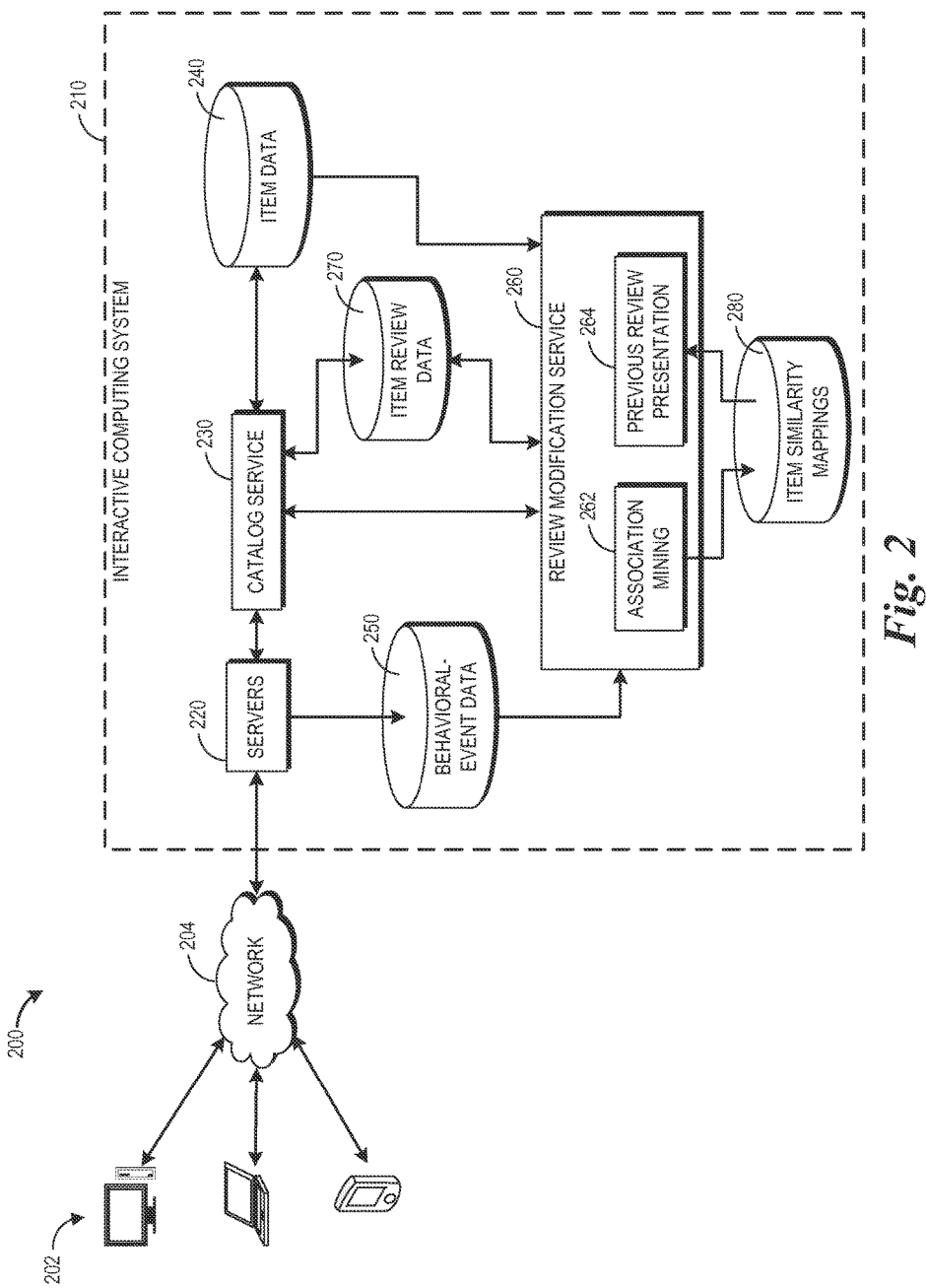
FIG. 2 is a pictorial diagram of a network environment for providing users with access to an interactive computing system for developing and providing user reviews.

FIG. 2 illustrates one embodiment of an operating environment 200 including an interactive system 210 for developing and providing user reviews. The system 210 can include a server 220 that provides network-based user access to an electronic catalog of items that are available for purchase, rental, download, and/or other transaction types. The server 220 may include multiple distinct server machines, such as web server machines. For purposes of illustration, it will be assumed that the system 210 hosts a network site that provides functionality for enabling users to acquire items represented in the catalog, although this need not be the case. The interactive system 210 may be accessed over a network 204 by users via one or more types of user computing devices 202, such as a laptop or tablet computer, personal computer, personal digital assistant (PDA), hybrid PDA/mobile phone, mobile phone, smartphone, global positioning system (GPS) device, electronic book reader, set top box, camera, audiobook player, digital media player, video game console, in-store kiosk, television, appliance, electronic device for inclusion in vehicles or machinery, gaming device, or the like. The network 204 may be any wired network, wireless network, or combination thereof (e.g., the Internet, a mobile communications network, and the like).

As is conventional, the electronic catalog may include, for each item available for acquisition from the interactive computing system 210, data used to generate a network page that describes the item (also referred to as an item detail page) for each item, and data used to generate a hierarchical browse tree for browsing the items by item category. Information about the various items (item images, descriptions, prices, etc.) may be stored in an item data store 240 or other data repository. The server 220 may retrieve item data from the data store 240 via a catalog service 230 and populate network pages (e.g., web pages) with such item data. The various components for dynamically generating network pages, including pages for presenting and developing item reviews of the type shown in FIGS. 1A and 1B, are represented by the review modification service 260.

The item data store 240 and item review data store 270 may be embodied in hard disk drives, solid state memories, any other type of non-transitory computer-readable storage medium, and/or a file, a database, a relational database, stored in any such non-transitory computer-readable medium accessible to the catalog service 230. The item data store 240 and item review data store 270 may also be distributed or partitioned across multiple local and/or remote storage devices without departing from the spirit and scope of the present disclosure. For example, item data may be stored in different storage devices and/or accessed via different services. In some embodiments, the item data store 240 may implemented as a data storage web service.

As users browse the electronic catalog and perform various types of actions (such as viewing and purchasing items), the system 210 may record one or more types of item-related events in a behavioral event data repository 250. This data repository 250 may, in some implementations, include multiple distinct log files and/or databases. In some embodiments, the data repository 250 may be embodied in various types of computer-readable storage similar to the item data store 240. The recorded events may include, for example, item purchase events, item order events, item selection events, item viewing events (which may be based on visits to item detail pages), "shopping cart add" events, "wish list add" events, item review events, and/or any other type of user action that evidence item similarity. Feedback provided by users regarding items in the electronic catalog 230 can be stored in the item review data store 270. The feedback can be stored in an aggregate manner (e.g., aggregate rating for an item by all users) as well as in distinct log files and/or databases associated with each user such that each user's item review history is stored in association with the user.

The recorded events or event histories stored in the behavioral event data repository 250 may be analyzed periodically by an association mining component 262 of the review modification service 260 to generate item to item associations, for example for use in identifying and recommending previously-reviewed similar items to a source item. Association mining component 262 may generate related item lists according to methods disclosed in U.S. Pat. No. 7,685,074, the entirety of which was incorporated by reference above. The association mining component 262 can store similarity data, for example in the form of item-to-item mappings, in item similarity mappings data repository 280.

Previous review presentation component 264 can receive similar item data from the association mining component 262 and/or item similarity mappings data repository 280 as well as receiving item review history data from the item review data store 270. The previous review presentation component 264 can determine which similar items to a source item were previously reviewed by the user and generate a prompt for presenting such items to the user together with the previously-provided review and optionally functionality to modify or supplement the previous review. Modified or supplemented reviews can be stored in the item review data store 270.

In one embodiment, the similar item data is pre-generated, that is, generated in advance of a user requesting a content page including a user interface for displaying previously-reviewed similar items. In another embodiment, the similar item data can be generated partly or wholly in response to the user requesting a content page including a user interface for displaying previously-reviewed similar items. The request can include information regarding the user device, for example display size, browser or application type, and the like, such that a presentation of previously-reviewed similar items can be generated dynamically in order to present the user with multiple groupings of previously-reviewed similar items one group at a time on the display.

Example Review Presentation Techniques

Figure 3:
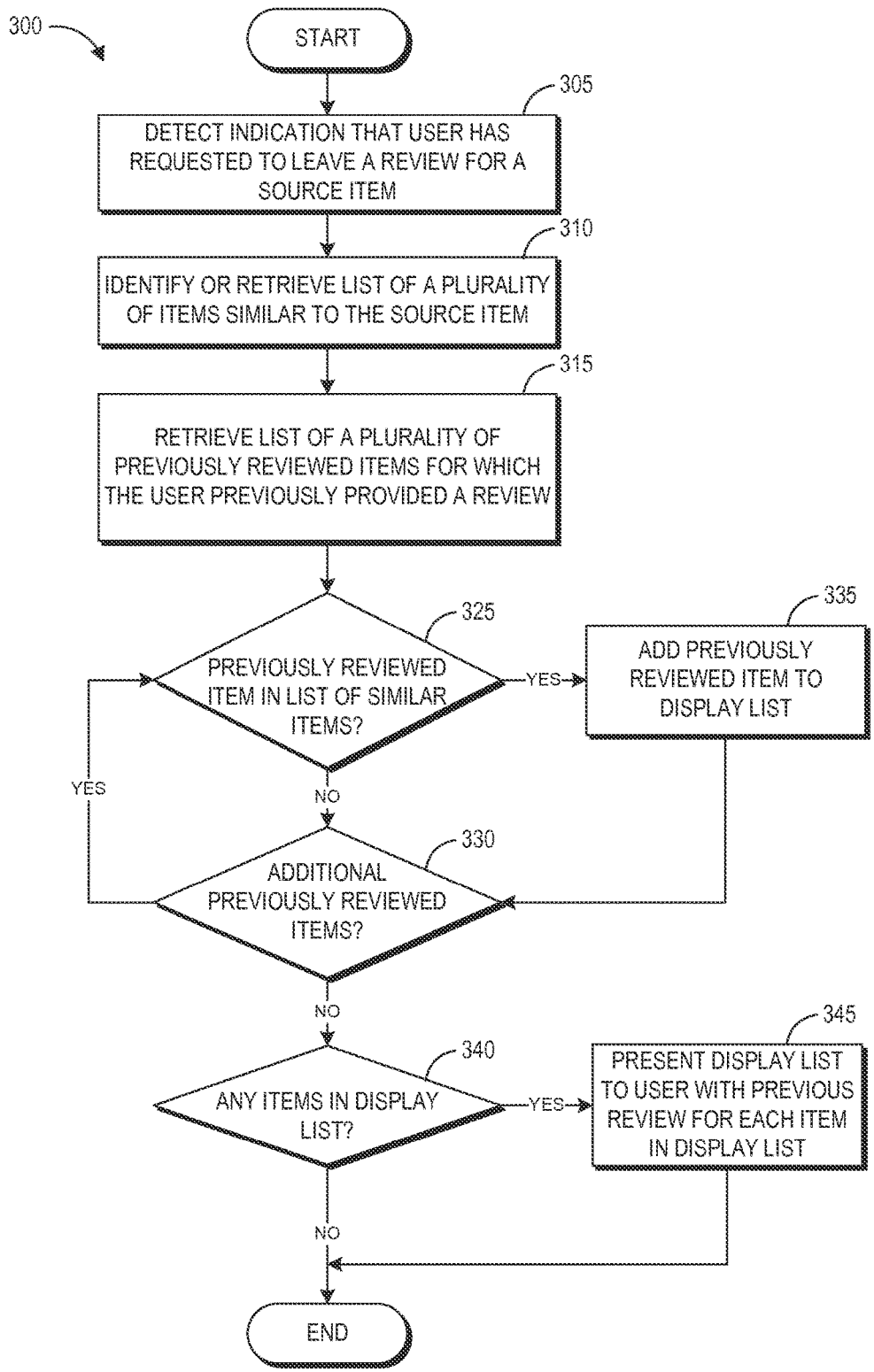
FIG. 3 is a flow diagram depicting an illustrative embodiment of a process that may be implemented by an interactive system, such as the system of FIG. 2, to provide user reviews.

FIG. 3 illustrates an example of a similar item previous review presentation process 300. Any of the computing devices or services shown in FIG. 2 can implement the process 300. For ease of illustration, however, the process 300 is described as being implemented by the interactive computing system 210, and in particular, the review modification service 260.

At block 305, the review modification service 260 detects an indication that a user has requested to leave a review for a source item. The indication can be selection by the user of user interface functionality enabling the user to provide a review for the source item. In other embodiments, the process 300 may be triggered by the user's submission of an item review.

At block 310, the review modification service 260 identifies or retrieves a list of items similar to the source item. As described above, the similar items can be identified based on logged user behaviors, such as logged item viewing actions, in some embodiments. The item similarities may additionally or alternatively be based on an automated comparison of item attributes (price, category, weight, description, etc.). In some examples, the similar items can be based on user behavior indicating a tendency to modify a review of a second item after providing a review of a first item. The similar item data can be generated in advance and retrieved by the review modification service 260 in some embodiments.

At block 315, the review modification service 260 retrieves a list of a plurality of previously reviewed items for which the user previously provided feedback, e.g., a review. The plurality of previously reviewed items can be accessed from an item review history of the user, for instance stored in item review data repository 270.

At decision block 325, the review modification service 260 determines whether a previously reviewed item of the retrieved previously reviewed items is also in the list of similar items. The review modification service 260 can sequentially compare the previously reviewed items to the similar items list, or vice versa, or employ other known list-to-list correlation methods.

If, at block 325, the review modification service 260 determines that the previously reviewed item is also in the list of similar items, then the process 300 moves to block 335. At block 335, the previously reviewed item is added to the display list. Next, the process transitions to block 330. As well, if, at block 325, the review modification service 260 determines that the previously reviewed item is not in the list of similar items, then the process 300 moves to block 330.

At block 330, the review modification service 260 determines whether there are any additional previously reviewed items remaining for comparison with the similar items. If additional previously reviewed items remain, the process 300 loops back to block 325 to compare the next previously reviewed item to the similar items. If no previously reviewed items remain, then the process 300 transitions to decision block 340.

In some examples, the items determined at blocks 325-330 for inclusion in the display list can be ranked based on a similarity score comparing the items to the source items. In other examples, the items determined at blocks 325-330 for inclusion in the display list can be ranked based on item popularity data such that items about which other users are more likely to want to read reviews are surfaced before less popular items. Item popularity data can be determined in some embodiments based on item viewing events, item purchase events, and other user behavior stored in the behavioral-event data repository 250.

At decision block 340, the review modification service 260 determines whether there are any items in the display list (e.g., any similar items that the user previously reviewed). If there are no items in the display list, then the process 300 ends without presenting any previously-reviewed items to the user.

If there are items in the display list, then the process 300 transitions to block 345, at which the review modification service 260 presents the display list to the user with each item presented together with the user's previous rating and/or review for the item. The display list may be presented to the user in a previous-review display area near a review creation interface as depicted above in FIG. 1A.

According to the above description, the process 300 can be used to present a user with previous feedback submitted by the user regarding similar items to a source item that the user is currently reviewing. Advantageously, this can provide the user with comparisons for eliciting more meaningful item feedback. Though not illustrated, the process 300 can optionally provide the user with functionality to modify or supplement some or all of the presented previous item reviews. This option may be omitted where, for example, the item is no longer available or the review is older than a selected time threshold.

Figure 4:
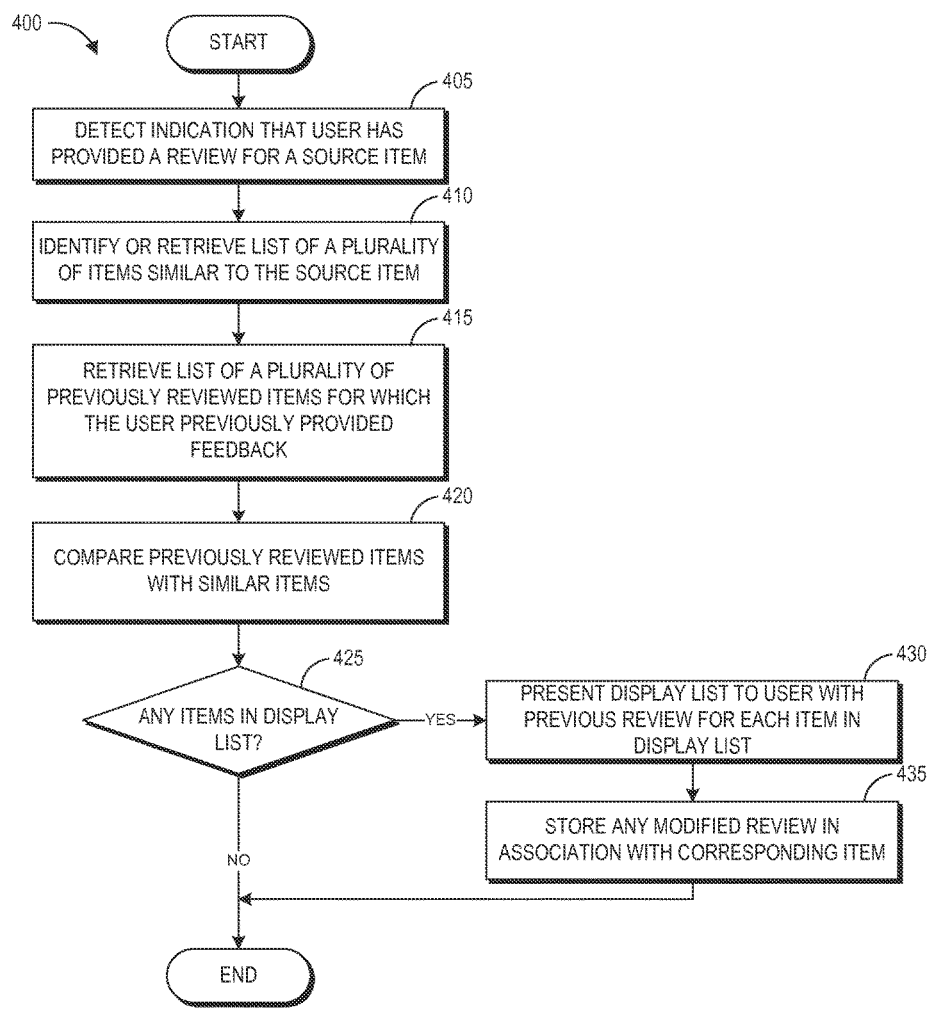
FIG. 4 is a flow diagram depicting another illustrative embodiment of a process that may be implemented by an interactive system, such as the system of FIG. 2, to develop modified user reviews.

FIG. 4 illustrates an example of a similar item previous review modification process 400. Any of the computing devices or services shown in FIG. 2 can implement the process 400. For ease of illustration, however, the process 400 is described as being implemented by the interactive computing system 210, and in particular, the review modification service 260.

At block 405, the review modification service 260 detects an indication that a user has provided a review of a source item. The indication can be selection by the user of user interface functionality submitting a review for the source item.

At block 410, the review modification service 260 identifies or retrieves a list of items similar to the source item. As described above, the similar items can be identified based on logged user behaviors, an automated comparison of user attributes, and/or another appropriate measure of item similarity.

At block 415, the review modification service 260 retrieves a list of previously reviewed items for which the user previously provided feedback, e.g. a review. The previously reviewed items can be accessed from an item review history of the user, for instance stored in item review data repository 270.

At block 420, the review modification service 260 compares previously reviewed items with similar items. For example, this can be done according to the description provided above with respect to blocks 325-335. In other embodiments other known list-to-list correlation methods can be implemented. In some examples, the display list can be segmented into subgroups of determined items based, for example, on a known display area size on a display of a device of the user.

At decision block 425, the review modification service 260 determines whether there are any items in the display list (e.g., any similar items that the user previously reviewed). If there are no items in the display list, then the process 400 ends without presenting any previously-reviewed items to the user.

If there are items in the display list, then the process 400 transitions to block 430, at which the review modification service 260 presents (or generates for presentation) a prompt including the display list (or a portion or subgroup thereof) to the user with each item presented together with the user's previous review for the item and functionality for the user to modify or supplement the previous review. The display list may be presented to the user in a review modification interface as depicted above in FIG. 1B in one example. As discussed above with respect to FIGS. 1A and 1B, in some embodiments the presentation can be updated based on user-selection of navigation options or provision of modified or supplemental feedback. In other examples, the prompt can be provided to the user via an electronic message.

At block 435, the review modification service 260 stores any modified or supplemental reviews in association with the corresponding item. Modified ratings can be used to determine updated aggregated item ratings. The modified or supplemental reviews and associated contextual data can be exposed to other users viewing the modified rating in some embodiments.

Terminology

The foregoing embodiments have been presented by way of illustration, and not limitation. Thus, nothing in the foregoing description is intended to imply that any particular feature, characteristic or step is essential to the invention. For example, although portions of this disclosure refer to a web site that provides online shopping functionality, the invention is not limited either to web site based implementations or to shopping systems.

The various components shown in FIG. 2, and the various processes described above (including those shown in FIGS. 3 and 4) may be implemented in a computing system via an appropriate combination of computerized machinery (hardware) and executable program code. For example, the catalog service 230, review modification service 260, and other personalization services may each be implemented by one or more physical computing devices (e.g., servers) programmed with specific executable service code. Each such computing device typically includes one or more processors capable of executing instructions, and a memory capable of storing instructions and data. The executable code may be stored on any appropriate type or types of non-transitory computer storage or storage devices, such as magnetic disk drives and solid-state memory arrays. Some of the services and functions may alternatively be implemented in application-specific circuitry (e.g., ASICs or FPGAs). The various databases and data repositories 240, 250, 270, 280 shown in FIG. 2 may be implemented using relational databases, flat file systems, tables, and/or other types of storage systems that use non-transitory storage devices (disk drives, solid state memories, etc.) to store data. Each such data repository may include multiple distinct databases. In a typical implementation, the recommendations provided to users, including the previous item review recommendations presented by the item detail pages 100A, 100B, are based on an automated analysis of many recorded actions of a single user and/or millions of recorded actions of many thousands or millions of users. As explained above, the item detail pages 100A, 100B may, in some embodiments, be implemented partly or wholly in client-side application code that runs on users' computing devices.

Catalog service 230 and review modification service 260, portions thereof, and combinations thereof may be implemented by one or more servers 220. In other embodiments, either of the catalog service 230 and review modification service 260 may be implemented by one or more server machines distinct from the servers 220. In yet other embodiments, the interactive computing system 210, the servers 220, the catalog service 230, and/or the review modification service 260 may be implemented by one or more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a cloud computing environment.

Further, the processing of the various components of the illustrated systems can be distributed across multiple machines, networks, and other computing resources. In addition, two or more components of a system can be combined into fewer components. For example, the various systems illustrated as part of the interactive computing system 210 can be distributed across multiple computing systems, or combined into a single computing system. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, operation, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of eliciting modified customer feedback of items of an electronic catalog, the method comprising:
receiving, from a computing device of a user, a submission over a network of a review from a user regarding a first item of the electronic catalog, the review submitted from a page that includes a review creation user interface;
identifying a plurality of additional items of the electronic catalog that, based on a measure of similarity, are similar to the first item;
determining a previous review from the user regarding a second item of the plurality of additional items, said previous review received over a network from said user prior to receiving the review regarding the first item;
generating an interactive review modification user interface that identifies the second item as a similar item previously reviewed by the user, the interactive user interface including functionality to modify the previous review regarding the second item; and
in response to the submission by the user of the review regarding the first item, causing the computing device to modify a display of said page by presenting the interactive review modification user interface as an overlay on the page;

wherein the method is performed programmatically by one or more computing devices.

2. The method of claim 1, wherein the measure of similarity is based at least partly on an analysis of item viewing histories of users.

3. The method of claim 1, wherein the measure of similarity is based at least partly on an analysis of item attributes or content.

4. The method of claim 1, wherein the measure of similarity, as applied to measuring similarity between the first and second items, is based at least partly on an analysis of user behavioral data indicating that other users who have provided reviews regarding the first item later modified previous reviews regarding the second item.

5. The method of claim 1, wherein causing the computing device to modify a display of the page comprises causing the interactive review modification user interface to overlay the review creation user interface on the page.

6. The method of claim 5, wherein the interactive review modification user interface enables the user to directly modify the previous review, such that the user can edit the previous review without navigating to a separate page.

7. A process implemented by execution of program instructions by a computing system comprising one or more processors, the process comprising:

receiving an electronic submission from a user of a review of a first catalog item represented in an electronic catalog;

subsequently, receiving an electronic submission from the user of a review of a second catalog item represented in the electronic catalog, said review of the second catalog item submitted from a computing device of the user via a page that identifies the second catalog item and that includes a review creation user interface for the second catalog item;

determining that the first and second catalog items are similar based on a measure of similarity;

generating an interactive review modification user interface, the review modification user interface identifying the first catalog item as similar to the second catalog item, the review modification user interface providing an option to modify the review of the first catalog item; and responding to the electronic submission of the review of the second catalog item by causing the computing device to present the interactive review modification user interface overlaying a portion of said page.

8. The process of claim 7, wherein the review modification user interface enables the user to directly modify the review of the first item, such that the user can modify the review of the first item without navigating away from the page.

9. The process of claim 7, wherein the page, prior to submission of the review of the second catalog item, displays a representation of the first catalog item and of the review of the first catalog item.

10. The process of claim 7, wherein causing the computing device to display the interactive review modification user interface comprises causing the computing device to display the interactive review modification user interface as a popover on the page.

11. The process of claim 7, wherein the review modification user interface includes a user-selectable display element that is selectable to initiate a review modification operation.

12. The process of claim 7, wherein the measure of similarity is based at least partly on an automated analysis of item viewing histories of users.

13. The process of claim 7, wherein said portion of the page is a portion that includes the review creation user interface, such that the interactive review modification user interface is displayed in place of the review creation user interface while other portions of the page remain visible.

* * * * *